United States Patent
Savithri et al.

(10) Patent No.: US 9,639,640 B1
(45) Date of Patent: May 2, 2017

(54) GENERATION OF DELAY VALUES FOR A SIMULATION MODEL OF CIRCUIT ELEMENTS IN A CLOCK NETWORK

(71) Applicant: Xilinx, Inc., San Jose, CA (US)

(72) Inventors: Nagaraj Savithri, Plano, TX (US); Robert M. Ondris, Santa Clara, CA (US); Chiao K. Hwang, Bakersfield, CA (US)

(73) Assignee: XILINX, INC., San Jose, CA (US)

( * ) Notice: Subject to any disclaimer, the term of this patent is extended or adjusted under 35 U.S.C. 154(b) by 57 days.

(21) Appl. No.: 14/693,506

(22) Filed: Apr. 22, 2015

(51) Int. Cl.
*G06F 17/50* (2006.01)

(52) U.S. Cl.
CPC ...... *G06F 17/5031* (2013.01); *G06F 17/5027* (2013.01)

(58) Field of Classification Search
USPC ......................................................... 716/108
See application file for complete search history.

(56) References Cited

U.S. PATENT DOCUMENTS

| | | | | |
|---|---|---|---|---|
| 8,307,320 | B2* | 11/2012 | Terazawa | H03K 19/17728 327/261 |
| 2003/0006750 | A1* | 1/2003 | Roberts | G04F 10/06 324/76.53 |
| 2005/0057315 | A1* | 3/2005 | Groen | H03K 3/0322 331/57 |
| 2005/0210179 | A1* | 9/2005 | Walmsley | B41J 2/04505 711/3 |
| 2008/0178130 | A1* | 7/2008 | He | G06F 17/5022 716/113 |
| 2016/0140272 | A1* | 5/2016 | Mohan | G06F 17/5031 716/108 |

\* cited by examiner

*Primary Examiner* — Mohammed Alam
(74) *Attorney, Agent, or Firm* — LeRoy D. Maunu (57) ABSTRACT

An approach for generating delay values for circuit elements in a clock network of a programmable IC includes determining for each clock resource in the clock network, different possible contexts of the clock resource. Each context specifies a combination of possible types of circuit elements in the context. Circuit elements of the possible types are selected from the different contexts, and configuration data is generated for implementation of respective ring oscillator circuits that include the selected circuit elements. The programmable IC is configured with the configuration data, and the programmable IC as configured with the respective ring oscillator circuits is operated. Respective delay values of the selected circuit elements are determined from output of the ring oscillator circuits. The delay values are stored in association with identifiers of the selected circuit elements in a memory arrangement.

20 Claims, 6 Drawing Sheets

GENERATION OF DELAY VALUES FOR A SIMULATION MODEL OF CIRCUIT ELEMENTS IN A CLOCK NETWORK

TECHNICAL FIELD

The disclosure generally relates to generating delay values for circuit elements of clock resources in a simulation model.

BACKGROUND

Programmable logic devices (PLDs) are a well-known type of programmable integrated circuit (IC) that can be programmed to perform specified logic functions. One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile may include both programmable interconnect and programmable logic. The programmable interconnect typically includes a large number of interconnect lines of varying lengths interconnected by programmable interconnect points (PIPs). In some FPGAs, the interconnect lines may include single, double, quad, and long lines, which refer to the relative lengths of the interconnect lines. The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Qualifying a programmable IC for purposes of determining a maximum clock rate at which the IC may be operated can be challenging, because programmable ICs are highly configurable. For example, the clock network for distributing clock signals throughout the programmable IC includes PIPs, and the delay through a PIP is highly dependent on the context in which the PIP is used. Assuming a worst case delay for a context of a PIP may result in an underestimation of the maximum clock rate.

Past approaches for validating clock signal delays that were on measured values of elements of a programmable IC employed a limited number of ring oscillators to determine delays of clock resources in the clock network. The limited number of ring oscillators restricts the number of contexts of PIPs that can be verified. For example, using 10-15 manually-generated ring oscillators for a device such as the KINTEX® model XCKU040 from XILINX®, Inc., about 15% of the thousands of PIP contexts in the clock network of the device are covered. The delays of the untested PIP contexts are estimated based on the measured values. The estimation may result in too much margin in some PIP contexts and not enough margin in other PIP contexts.

SUMMARY

A method of generating delay values for a simulation model of circuit elements in a clock network of a programmable IC includes determining for each clock resource in the clock network, different possible contexts of the clock resource. Each context specifies a combination of possible types of circuit elements in the context. Circuit elements of the possible types are selected from the different contexts, and configuration data is generated for implementation of respective ring oscillator circuits that include the selected circuit elements. The programmable IC is configured with the configuration data, and the programmable IC as configured with the respective ring oscillator circuits is operated. Respective delay values are determined from output of the ring oscillator circuits. The delay values are stored in association with identifiers of the selected circuit elements in the simulation model.

In another embodiment, a system includes a processor and a memory that is coupled to the processor. The memory is configured with instructions for generating delay values for a simulation model of circuit elements in a clock network of a programmable IC. The instructions when executed by the processor, cause the processor to determine for each clock resource in the clock network, different possible contexts of the clock resource. Each context specifies a combination of possible types of circuit elements in the context. Circuit elements of the possible types are selected from the different contexts, and configuration data is generated for implementation of respective ring oscillator circuits that include the selected circuit elements. The programmable IC is configured with the configuration data, and the programmable IC as configured with the respective ring oscillator circuits is operated. Respective delay values are determined from output of the ring oscillator circuits. The delay values are stored in association with identifiers of the selected circuit elements in the simulation model.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosure describes approaches for generating delay values for a simulation model of circuit elements of clock resources in a clock network of a programmable IC. The "clock network" of a programmable IC distributes clocks signals to the clock pins of synchronous circuits of the programmable IC, and the clock network includes "clock resources" for routing the clock signals. Clock resources include circuit elements such as drivers, nodes, and programmable interconnect points (PIPs). A PIP may be configured to route a clock signal. The clock network includes many such PIPs, and the configuration of the programmable IC may create different contexts for many of the PIPs. Each context includes a set of circuit elements, and each of the circuit elements in a particular context is of one type of multiple alternative types. The circuit elements in a context are also clock resources. Each context may further include a number of additional characteristics, and each characteristic is of one type of multiple alternative types for that characteristic.

The disclosed approaches provide accurate delay values for the clock resources in a clock network, by accounting for the many different contexts in which the clock resources may be employed in a circuit design. In a method of generating delay values for a simulation model of circuit elements in a clock network of a programmable IC, different possible contexts of the clock resource are determined for each clock resource in the clock network. Each context specifies a combination of possible types of circuit elements in the context. Circuit elements of the possible types are selected from the different contexts, and configuration data is generated for implementation of respective ring oscillator circuits that include the selected circuit elements. The programmable IC is configured with the configuration data that specifies the respective ring oscillator circuits including the selected circuit elements, and the programmable IC is operated with the respective ring oscillator circuits. Based on frequency measurements taken from the ring oscillator circuits, respective delay values are determined, and the delay values are stored in association with representations of the selected circuit elements in the simulation model. The stored delay values may be subsequently used in a timing analysis of a circuit design to estimate clock signal delays through clock resources having different contexts.

Figure 1:
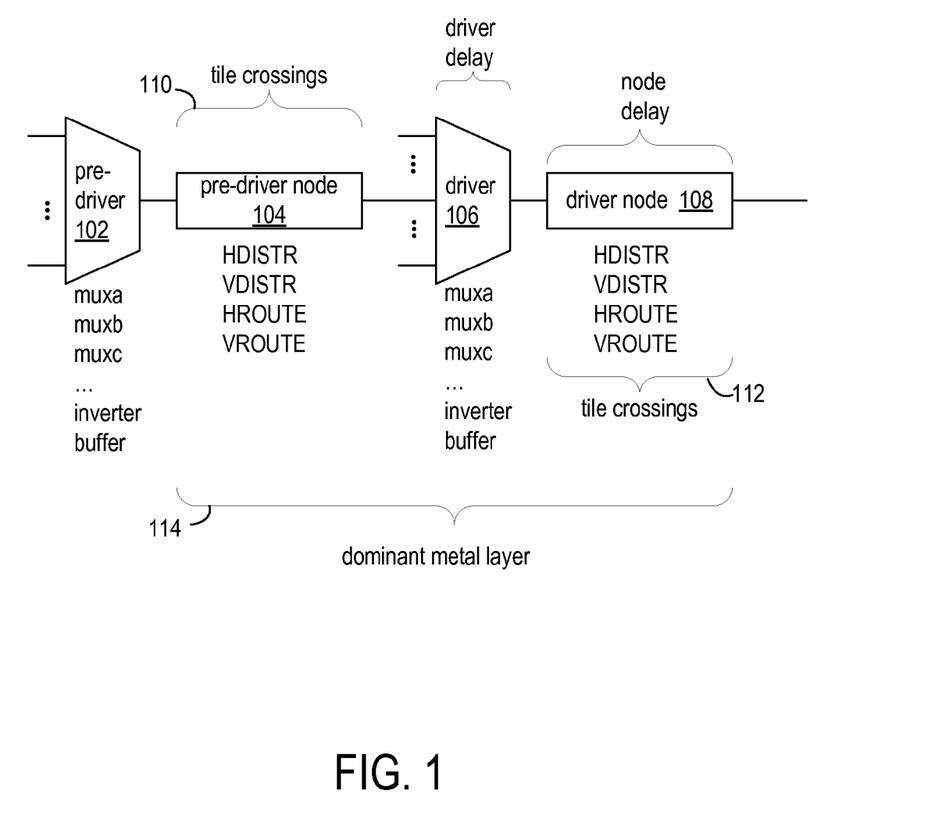
FIG. 1 shows examples of circuit elements that may be part of a context of a clock resource of a clock network.

FIG. 1 shows examples of circuit elements that may be part of a context of a clock resource of a clock network. The context may include additional characteristics that are associated with the circuit elements. The circuit elements include pre-driver 102, pre-driver node 104, driver 106, and driver node 108, and the additional characteristics include tile crossings 110 and 112 and dominant metal layer 114. The alternative types of the circuit elements are listed below the circuit elements. For example, in a FPGA from XILINX®, the pre-driver may be of type muxa, muxb, muxc, inverter, or buffer. The alternative types of the driver 106 may be similar to those of the pre-driver 102. A PIP in an FPGA corresponds to driver 106. The types of the characteristics of the pre-driver node 104 include the different types and lengths of clock lines that may be connected to the pre-driver 102. In some XILINX FPGAs, for example, in the clock network the types of pre-driver nodes include HDISTR (horizontal distribution), VDISTR (vertical distribution), HROUTE (horizontal route), and VROUTE (vertical route). The alternative types of the driver node 108 may be similar to those of the pre-driver node.

Tile crossings of the pre-driver node 104 and tile crossings of the driver node 108 are additional characteristics that define the context of the interconnect circuit. The type of a tile crossing indicates a set of one or more tiles that the node crosses. For example, tiles in an FPGA may include CLB tiles, IOB tiles, BRAM tiles, DSP tiles etc. The type of the tile crossing indicates one or more of the tiles. For example, the type of a tile crossing may be a combination of one or more of CLB, BRAM, or IOB.

The dominant metal layer of the pre-driver node 104 and the driver node 108 is another characteristic that may define the context. The dominant metal layer is the metal layer of the die that is occupied by the majority of the combination of the pre-driver node and the driver node. For example, if the pre-driver node is an HDISTR line in metal layer M2, and the driver node is a VROUTE line in metal layer M4, the dominant metal layer might be M4 if the VROUTE line occupies a larger area than the HDISTR line.

Each context has a different set of types of circuit elements and types of other characteristics. Two different instances of the same clock resource, such as a PIP at different locations on the programmable IC, may have the same associated types of circuit elements and associated types of other characteristics, but the contexts may be considered different, because the contexts are associated with different instances of the clock resource, and different instances of circuit elements and clock resources may introduce different delays depending on locations of the instances on the IC die.

The examples of circuit elements, characteristics, and alternative types are those from an FPGA. It will be recognized, however, that other types of programmable ICs may have different circuit elements, and the disclosed approaches may be readily adapted to determine delay values for clock resources in those different programmable ICs.

Figure 2:
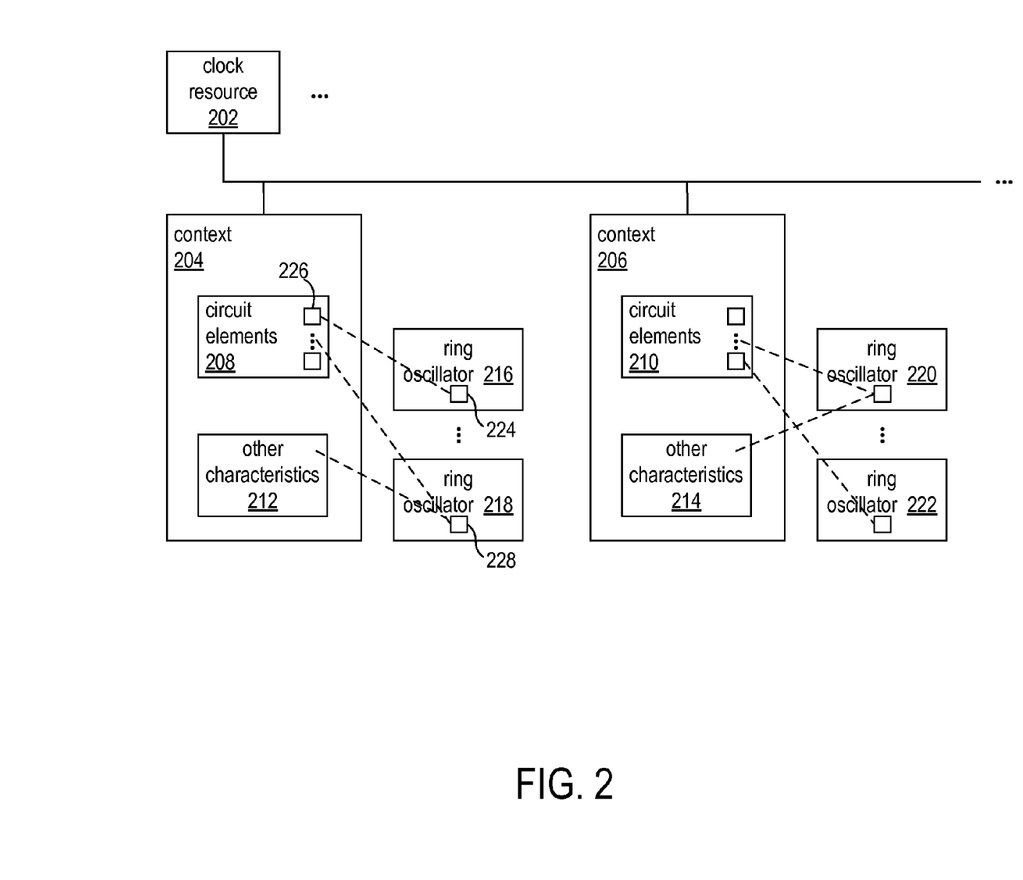
FIG. 2 shows the relationship between a clock resource, possible contexts, circuit elements of each context, other characteristics of the contexts, and ring oscillator circuits generated to include selected ones of the circuit elements.

FIG. 2 shows the relationship between a clock resource 202, possible contexts 204, 206, . . . , circuit elements 208, 210 of each context, other characteristics 212, 214 of the contexts, and ring oscillator circuits 216, 218, 220, and 222 generated to include selected ones of the circuit elements. Though there are many clock resources in a clock network, only one is shown.

A clock resource 202 may have many different, alternative contexts. Each context of the clock resource is possible as provided by a particular configuration of the programmable IC. Each context 204 and 206 of the clock resource 202 includes the same circuit elements 208 and 210. However, the combination of types of the circuit elements varies between contexts. That is, the combination of types of circuit elements 208 and types of characteristics 212 is different from the combination of types of circuit elements 210 and types of characteristics 214.

From each context 204 and 206, a subset of the circuit elements 208 and 210 is selected for validation, and respective ring oscillator circuits 216, 218, 220, and 222 are generated. The selection of the circuit elements for the subset may depend on the amount of time available for testing and validation. If a long period of time is available, then a larger number of circuit elements may be selected for the subset, and if a shorter time is available, then a smaller number of circuit elements may be selected for the subset.

Each ring oscillator circuit includes one of the circuit elements of the type of that circuit element in the context. The type of one of the other characteristics from the context may be associated with the circuit element in the ring oscillator circuit. The dashed lines indicate the circuit elements and associated characteristics included from a context and included in the ring oscillator circuits. For example, ring oscillator circuit 216 includes circuit element 224, which is circuit element 226 of the type specified in the context 204. Similarly, ring oscillator circuit 218 includes circuit element 228, which is another one of the circuit elements 208 of the type specified in the context 204. The circuit element 228 also has one of the other characteristics 212 of the type of that characteristic in the context 204. As a concrete example, the circuit element 228 in ring oscillator circuit 218 may be a pre-driver node of type VDISTR (vertical distribution line), and the other characteristic may be a tile crossing of type BRAM. That is, the ring oscillator circuit 218 includes a vertical clock distribution signal line that crosses a BRAM tile.

Figure 3:
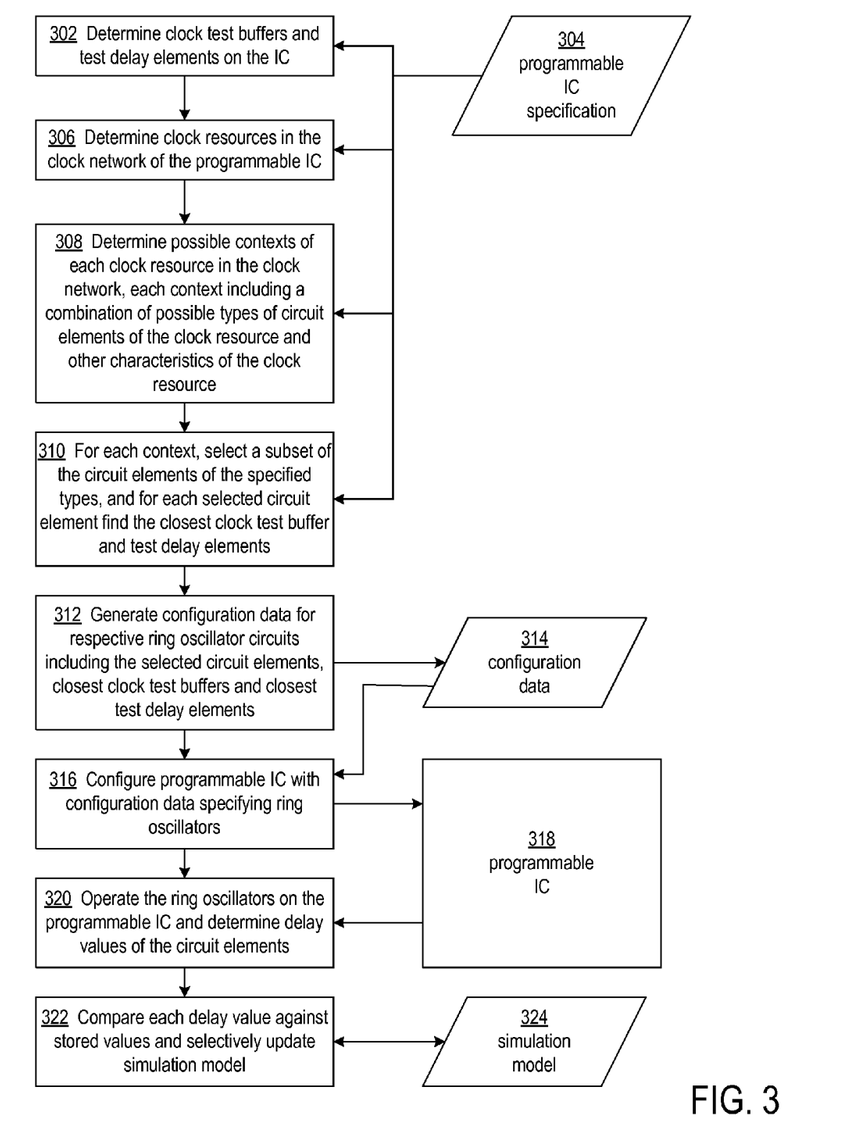
FIG. 3 is a flowchart of a process of generating delay values for a simulation model of circuit elements in a clock network of a programmable IC.

FIG. 3 is a flowchart of a process of generating delay values for a simulation model of circuit elements in a clock network of a programmable IC. At block 302, the process determines the clock test buffers and test delay elements that are available on the programmable IC based on a specification 304 of the programmable IC. The specification 304 of the programmable IC describes the circuitry that implements a particular programmable IC and identifies functional circuit elements (e.g., CLBs, BRAMs, DSPs, clock resources, etc.), interconnections between the functional elements, and the layout of the functional circuit elements and interconnections. The retrieved information includes locations of the clock test buffers and test delay elements. The clock test buffers and test delay elements are subsequently used in constructing ring oscillator circuits for the selected circuit elements in the different contexts.

At block 306, the clock resources of the programmable IC are determined from the specification 304. For example, the clock resources may be PIPs that may be programmed to distribute clock signals within the clock network of the programmable IC.

At block 308, different possible, alternative contexts are determined for each of the clock resources identified at block 306. Each context specifies a combination of possible types of circuit elements of the clock resource. A context may also specify types of other characteristics associated with the circuit elements of the context. The contexts may be identified by scanning the programmable IC specification 304, and for each clock resource identified at block 306, identifying the set of circuit elements that are connected to the clock resource and the associated types of those circuit elements. Other characteristics, for example, tile crossings, of the circuit elements are also identified at block 308.

A respective subset of the circuit elements and other characteristics of each context is selected at block 310. Thus, for N contexts, N subsets of circuit elements are selected. As previously indicated, the number of circuit elements and other characteristics selected for each subset may vary according to the time available for validation of the delays of the circuit elements. Also at block 310, for each selected circuit element, the clock test buffer and test delay elements that are nearest the circuit element are determined and selected for use in the implementation of a ring oscillator for the circuit element. The programmable IC specification 304 includes location information for the circuit elements, clock test buffers, and test delay elements.

At block 312, configuration data 314 is generated for implementation of respective ring oscillators for the circuit elements. That is, for each circuit element in each subset of circuit elements, configuration data is generated for implementation of a ring oscillator that includes that circuit element, the nearest clock test buffer, and nearest test delay elements. A design tool that performs synthesis, mapping, placing, routing, and generating of configuration data may be used to translate the ring oscillator circuit designs into configuration data for a programmable IC, for example. In an example implementation, the placing and routing of each ring oscillator circuit design uses constraints that describe particular resources to use in routing from the source gate to the destination gate. The constraints may specify the types and locations of the resources on a target device.

The configuration data may include multiple configuration bitstreams, because it may not be possible to validate all the circuit elements with a single configuration of the programmable IC. Because there are a limited number of clock test buffers and test delay elements, more than one of the circuit elements may require the same clock test buffer and test delay elements for implementation of the ring oscillators.

A programmable IC 318 is configured with the configuration data 314 at block 316 for implementation of the ring oscillators having the selected circuit elements. At block 320, the ring oscillators on the programmable IC are operated, and the delay value of each circuit element in each ring oscillator is determined by observing the frequency of the ring oscillator having the circuit element. Conventional equipment may be used to configure the programmable IC to implement the ring oscillator circuits and to test the maximum frequency of the ring oscillator circuits.

At block 322, the delay values determined for the circuit elements are compared to corresponding initial delay values in the simulation model 324. The simulation model includes speed files that characterize delays of circuit elements in the particular programmable IC. The initial delay values may have been generated from SPICE and/or Static Timing Analysis (STA). Because both SPICE and STA are computer simulation based, the initial delay values may not always match actual delays in the semiconductor die, and the actual delays could change over time.

Each delay value determined from one of the ring oscillators is compared to a corresponding one of the initial delay values in the speed files of the simulation model. For example, the delay value determined ("determined delay value") from a ring oscillator that includes a particular inverter-type driver is compared to the "stored delay value" in the simulation model for the same inverter-type driver. In response to the absolute value of the difference between the determined delay value and the stored delay value being greater than a threshold value, the determined delay value is stored in association with an identifier of the circuit element (e.g., the particular instance of the inverter-type driver) in the simulation model. In another implementation, the stored delay value may be replaced with the determined delay value regardless of the magnitude of the difference between the two values.

The simulation model may further include delay values associated with identifiers of particular types of clock circuit elements having particular types of characteristics. For example, the simulation model may include a delay value associated with an identifier of a particular instance of a driver node of type VROUTE and having a tile crossing characteristic of type CLB and DSP (the VROUTE-type driver node crosses both a CLB and a DSP block). There may be separate delay values associated with identifiers of a driver node of type VROUTE and having a tile crossing characteristic of type CLB, and a driver node of type VROUTE and having no tile crossing characteristic. Similarly, the simulation model may include delay values associated with identifiers of circuit elements having different dominant metal layers. For example, individual delay values may be associated with a pre-driver node of type HROUTE and a dominant metal layer M2 and another pre-driver node of type HROUTE and a dominant metal layer M3.

Steps 316, 320, and 322 may be repeated as may be needed for validating different circuit elements for different configuration bitstreams.

Figure 4:
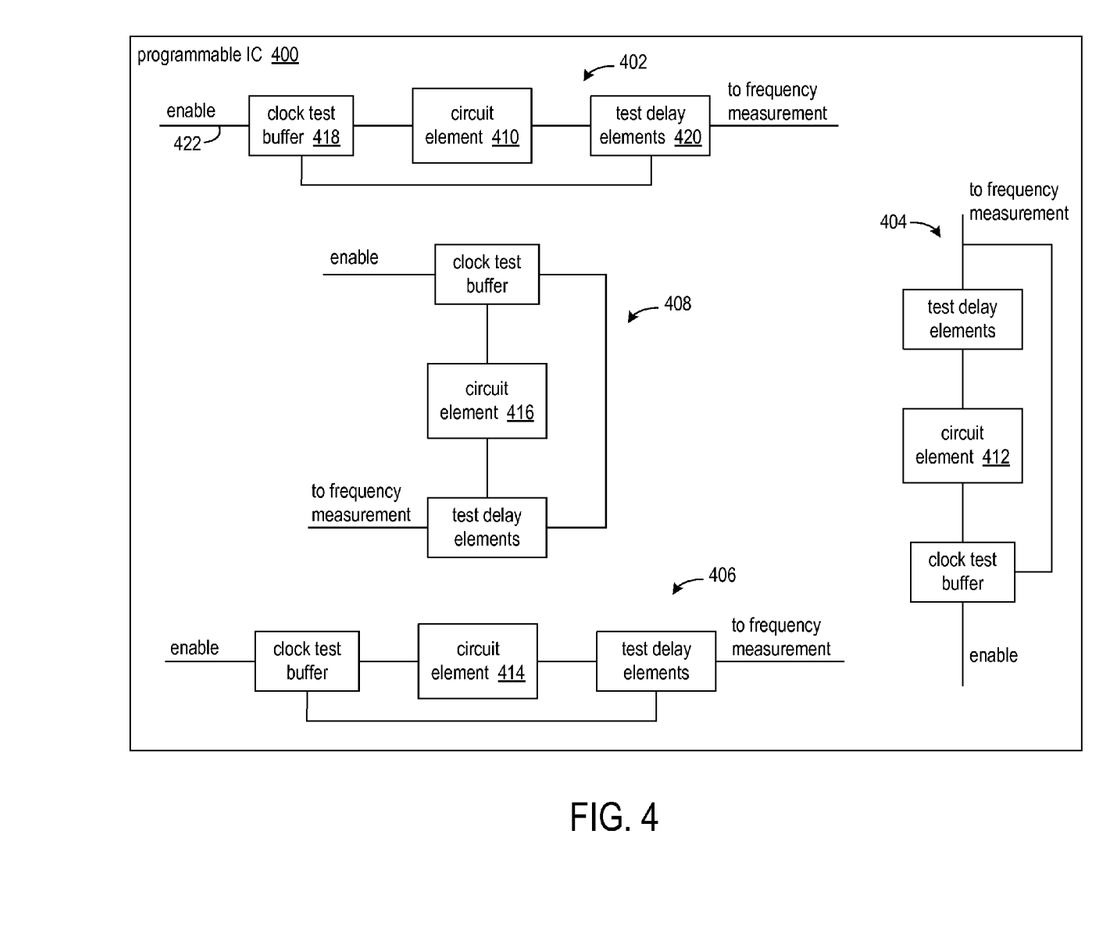
FIG. 4 shows respective ring oscillator circuits constructed to include the selected circuit elements from the contexts of clock resources in a clock network of a programmable IC.

FIG. 4 shows respective ring oscillator circuits 402, 404, 406, and 408 constructed to include the selected circuit elements from the contexts of clock resources in a clock network of a programmable IC 400. Each circuit element 410, 412, 414, and 416 corresponds to one of the selected circuit elements from one or more of the contexts of one or more clock resources of the programmable IC 400.

The ring oscillator configured for each circuit element includes the nearest clock test buffer and the nearest test delay elements. For example, the clock test buffer 418 on the programmable IC 400 is nearer the circuit element 410 than any of the other clock test buffers on the programmable IC. Similarly, test delay elements 420 is nearer the circuit element 410 than any of the other test delay elements on the programmable IC.

The enable signal 422 is provided to clock test buffer 418 to enable oscillating of the signal output from the clock test buffer. The frequency of the output signal from test delay elements 420 is measured using standard frequency measurement techniques, thereby providing an indication of the delay through circuit element 410. The maximum frequency of the signal from the test delay elements indicates the total delay of the clock test buffer, the circuit element 410, and the test delay elements. The delays of the clock source buffer and test delay elements may be known values and subtracted from the total delay to determine the delay of the circuit element 410.

Figure 5:
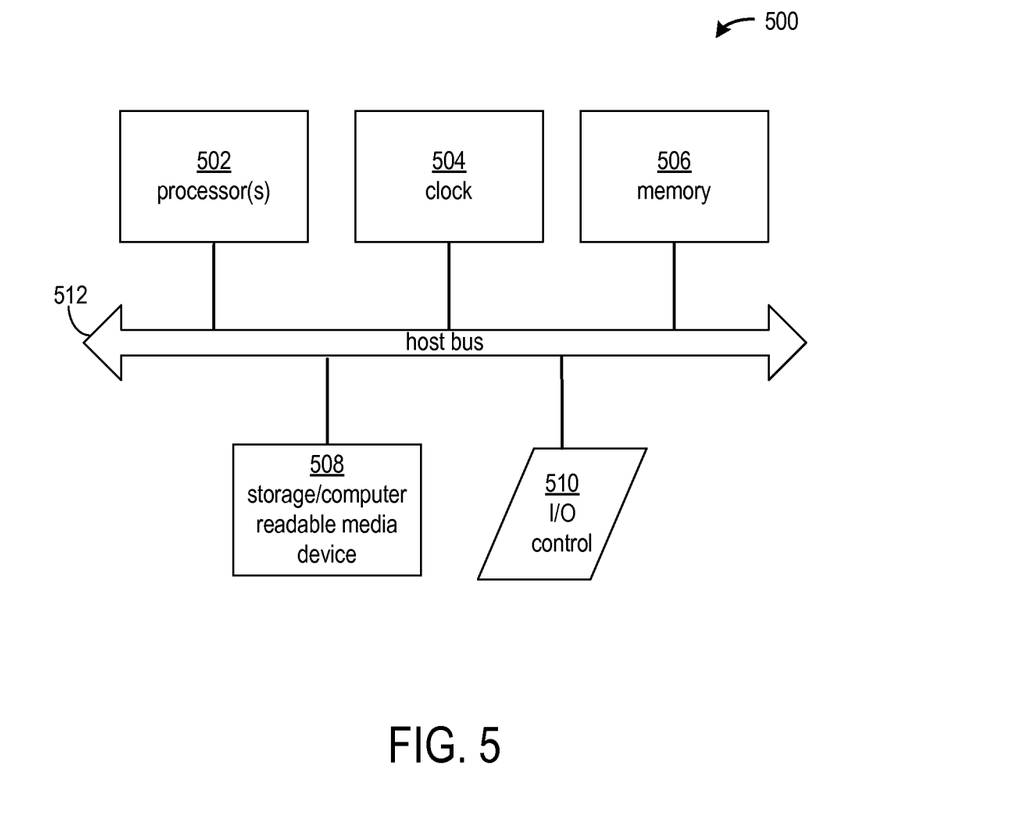
FIG. 5 shows a block diagram of an example computing arrangement that may be configured to implement the data structures and processes described herein.

FIG. 5 shows a block diagram of an example computing arrangement that may be configured to implement the data structures and processes described herein. It will be appreciated that various alternative computing arrangements, including one or more computer processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 500 includes one or more processors 502, a clock signal generator 504, a memory arrangement 506, a storage arrangement 508, and an input/output control unit 510, all coupled to a host bus 512. The arrangement 500 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 502 may be one or more general purpose processors, or a combination of one or more general purpose processors and suitable co-processors, or one or more specialized processors (e.g., RISC, CISC, pipelined, etc.).

The memory arrangement 506 typically includes multiple levels of cache memory, and a main memory. The storage arrangement 508 may include local and/or remote persistent storage, such as provided by magnetic disks (not shown), flash, EPROM, or other non-volatile data storage. The storage unit may be read or read/write capable. Further, the memory arrangement 506 and storage arrangement 508 may be combined in a single arrangement.

The processor(s) 502 executes the software in storage arrangement 508 and/or memory arrangement 506, reads data from and stores data to the storage arrangement 508 and/or memory arrangement 506, and communicates with external devices through the input/output control arrangement 510. These functions are synchronized by the clock signal generator 504. The resource of the computing arrangement may be managed by either an operating system (not shown), or a hardware control unit (not shown).

Figure 6:
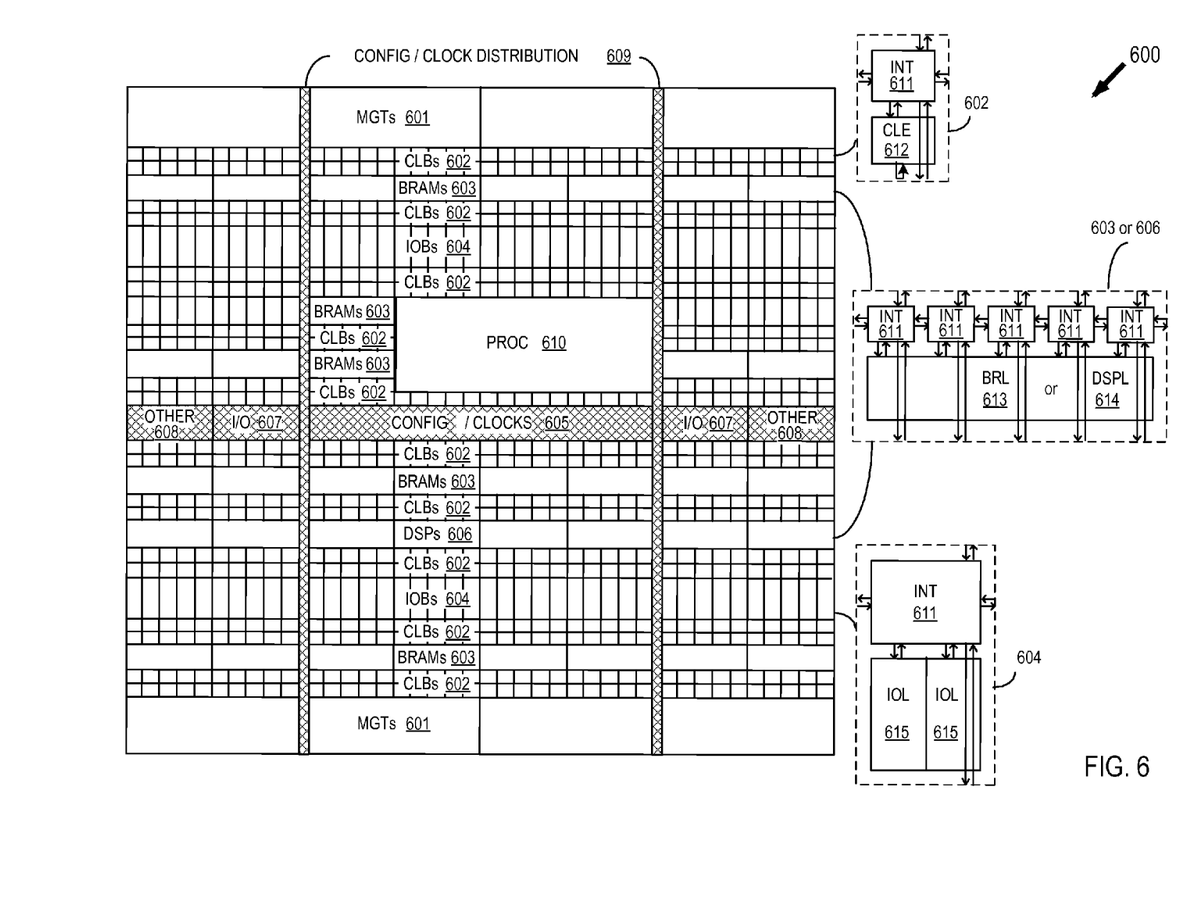
FIG. 6 shows a programmable integrated circuit (IC) on which the disclosed circuits and processes may be implemented.

FIG. 6 shows a programmable integrated circuit (IC) 600 on which the disclosed circuits and processes may be implemented. The programmable IC may also be referred to as a System On Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 606 can include a DSP logic element (DSPL) 614 in addition to an appropriate number of programmable interconnect elements. An IOB 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

In the pictured embodiment, a columnar area near the center of the die (shown shaded in FIG. 6) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual programmable IC, more than one adjacent column of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for determining delay values of circuit elements of clock resources in a programmable IC. Other aspects and features will be apparent to those skilled in the art from consideration of the specification. It is intended that the specification and drawings be considered as examples only, with a true scope of the invention being indicated by the following claims.

What is claimed is:

1. A method of generating delay values for circuit elements in a clock network of a programmable IC, comprising:
   determining from a specification of the programmable IC, respective locations of a plurality of clock test buffers and a plurality of test delay circuits on the programmable IC;
   determining with a computer processor for each clock resource in the clock network, different possible contexts of the clock resource, wherein each context specifies a combination of possible types of circuit elements of the programmable IC that are configurable for use with the clock resource;
   selecting circuit elements of the programmable IC of the possible types from the different contexts;
   generating configuration data for implementation of respective ring oscillator circuits that include the selected circuit elements on the programmable IC, wherein each ring oscillator circuit includes one of the selected circuit elements coupled between one of the plurality of clock test buffers and one of the plurality of test delay circuits;
   configuring the programmable IC with the configuration data that specifies the respective ring oscillator circuits including the selected circuit elements;
   operating the programmable IC with the respective ring oscillator circuits and determining respective delay values of the selected circuit elements from respective maximum frequencies of the ring oscillator circuits; and
   storing the delay values in association with identifiers of the selected circuit elements in a memory arrangement.

2. The method of claim 1, further comprising, determining a nearest one clock test buffer and a nearest one test delay circuit of the programmable IC that are nearest to each selected circuit element, and the respective ring oscillator for each selected circuit element includes the nearest one clock test buffer and nearest one test delay circuit.

3. The method of claim 1, further comprising, inputting a specification of the programmable IC and determining from the specification which clock resources of the programmable IC are in the clock network.

4. The method of claim 1, wherein:
   each context of one or more of the possible contexts further specifies one type of a plurality of different types of a tile crossing characteristic associated with a circuit element specified in the context; and
   the storing the delay values includes storing, for a circuit element of the selected circuit elements having an associated tile crossing characteristic of the one type, one of the delay values in association with a representation of the circuit element having the associated tile crossing characteristic of the one type in the memory arrangement.

5. The method of claim 1, wherein the selecting the circuit elements includes, selecting from each context, a subset of the circuit elements of the possible types.

6. The method of claim 5, further comprising:
   reading from the memory arrangement, initial delay values associated with the selected circuit elements;
   comparing the respective delay values and corresponding ones of the initial delay values; and
   storing, in response to a difference between one of the respective delay values and a corresponding one of the initial delay values being greater than a threshold value, the one of the respective delay values as the delay value associated with an identifier of a corresponding one of the circuit elements in the memory arrangement.

7. The method of claim 1, wherein the circuit elements include driver, driver node, pre-driver, and pre-driver node, and types of the driver and pre-driver include different types of multiplexers, inverters, and buffers, and types of the driver node and pre-driver node include different lengths and directions of clock lines.

8. The method of claim 7, wherein each context of one or more of the possible contexts further specifies one type of a plurality of different types of a tile crossing characteristic associated with a driver node specified in the context, and each type of tile crossing of the driver node indicates a type of tile of the programmable IC that the driver node crosses.

9. The method of claim 8, wherein each context of one or more of the possible contexts further specifies one type of a plurality of different types of a tile crossing characteristic associated with a pre-driver node specified in the context, and each type of tile crossing of the pre-driver node indicates a type of tile of the programmable IC that the pre-driver node crosses.

10. The method of claim 9, wherein each context of one or more of the possible contexts further specifies a metal layer associated with the pre-driver node and driver node specified in the context.

11. A system, comprising:
a processor;
a memory arrangement coupled to the processor, wherein the memory arrangement is configured with instructions for generating delay values for circuit elements in a clock network of a programmable IC, and the instructions when executed by the processor, cause the processor to perform operations including:
determining from a specification of the programmable IC, respective locations of a plurality of clock test buffers and a plurality of test delay circuits on the programmable IC;
determining for each clock resource in the clock network, different possible contexts of the clock resource, wherein each context specifies a combination of possible types of circuit elements of the programmable IC that are configurable for use with the clock resource;
selecting circuit elements of the programmable IC of the possible types from the different contexts;
generating configuration data for implementation of respective ring oscillator circuits that include the selected circuit elements on the programmable IC, wherein each ring oscillator circuit includes one of the selected circuit elements coupled between one of the plurality of clock test buffers and one of the plurality of test delay circuits;
configuring the programmable IC with the configuration data that specifies the respective ring oscillator circuits including the selected circuit elements;
operating the programmable IC with the respective ring oscillator circuits and determining respective delay values of the selected circuit elements from respective maximum frequencies of the ring oscillator circuits; and
storing the delay values in association with identifiers of the selected circuit elements in the memory arrangement.

12. The system of claim 11, wherein the instructions further include instructions that when executed by the processor cause the processor to determine a nearest one clock test buffer and a nearest one test delay circuit of the programmable IC that are nearest to each selected circuit element, and the respective ring oscillator for each selected circuit element includes the nearest one clock test buffer and nearest one test delay circuit.

13. The system of claim 11, wherein the instructions further include instructions that when executed by the processor cause the processor to input a specification of the programmable IC and determining from the specification which clock resources of the programmable IC are in the clock network.

14. The system of claim 11, wherein:
each context of one or more of the possible contexts further specifies one type of a plurality of different types of a tile crossing characteristic associated with a circuit element specified in the context; and
the instructions that cause the processor to store the delay values include instructions that cause the processor to store, for a circuit element of the selected circuit elements having an associated tile crossing characteristic of the one type, one of the delay values in association with a representation of the circuit element having the associated tile crossing characteristic of the one type in the memory arrangement.

15. The system of claim 11, wherein the instructions that cause the processor to select the circuit elements further include instructions that cause the processor to select from each context, a subset of the circuit elements of the possible types.

16. The system of claim 15, wherein the instructions further include instructions that when executed by the processor cause the processor to:
read from the memory arrangement, initial delay values associated with the selected circuit elements;
compare the respective delay values and corresponding ones of the initial delay values; and
store, in response to a difference between one of the respective delay values and a corresponding one of the initial delay values being greater than a threshold value, the one of the respective delay values as the delay value associated with an identifier of a corresponding one of the circuit elements in the memory arrangement.

17. The system of claim 11, wherein the circuit elements include driver, driver node, pre-driver, and pre-driver node, and types of the driver and pre-driver include different types of multiplexers, inverters, and buffers, and types of the driver node and pre-driver node include different lengths and directions of clock lines.

18. The system of claim 17, wherein each context of one or more of the possible contexts further specifies one type of a plurality of different types of a tile crossing characteristic associated with a driver node specified in the context, and each type of tile crossing of the driver node indicates a type of tile of the programmable IC that the driver node crosses.

19. The system of claim 18, wherein each context of one or more of the possible contexts further specifies one type of a plurality of different types of a tile crossing characteristic associated with a pre-driver node specified in the context, and each type of tile crossing of the pre-driver node indicates a type of tile of the programmable IC that the pre-driver node crosses.

20. The system of claim 19, wherein each context of one or more of the possible contexts further specifies a metal layer associated with the pre-driver node and driver node specified in the context.

* * * * *